United States Patent [19]
Hudspeth

[11] 3,842,430
[45] Oct. 15, 1974

[54] FOLDING CAMERA WITH LOW COST BELLOWS

[75] Inventor: William Hudspeth, Norwell, Mass.

[73] Assignee: Polaroid Corporation, Cambridge, Mass.

[22] Filed: Dec. 28, 1973

[21] Appl. No.: 429,092

[52] U.S. Cl................................ 354/187, 354/158
[51] Int. Cl...................... G03b 17/04, G03b 19/20
[58] Field of Search .......... 354/187, 158, 193, 192, 354/194, 189

[56] References Cited
UNITED STATES PATENTS
3,678,831   7/1972   Baker............................. 354/158 X
3,682,068   8/1972   Stieger............................. 354/187

Primary Examiner—Robert P. Greiner
Attorney, Agent, or Firm—John S. Vale

[57] ABSTRACT

A folding camera which features a low cost, collapsible and erectable bellows for excluding extraneous light from the camera's optical path. The bellows is formed from a single, flat, pre-shaped blank of flexible light opaque material having oriented stretch characteristics. The bellows includes a retaining plate for attaching its leading end to a movable camera housing section. By properly orienting the bellows material and using the retaining plate to direct tension forces, applied to the bellows as the camera is folded, along predetermined lines, the bellows may be folded along double fold lines to assume its collapsed position.

22 Claims, 12 Drawing Figures

FOLDING CAMERA WITH LOW COST BELLOWS

BACKGROUND OF THE INVENTION

1. Field of the Invention

The present invention relates to the field of photography and, more particularly, to compact folding cameras that include a collapsible and erectable light-excluding bellows.

2. Description of the Prior Art

The prior art is replete with numerous folding cameras that employ an erectable or extensible bellows to enclose and exclude extraneous or ambient light from the optical path between the camera's objective lens and the film support when the camera is erected.

There are certain bellows design, manufacturing and economic characteristics that are highly desirable. For example, the bellows should collapse along predetermined fold lines and occupy an absolute minimum of space in the folded condition.

When erected, the bellows or light excluding walls of the bellows must be dimensionally stable so as not to intrude into the camera's optical path or interfere with a fixed or movable mechanism (e.g., a reflex mirror) enclosed by or adjacent to the erected walls of the bellows.

Cycle life is extremely important. The bellows must be able to withstand thousands of cycles of movement between its collapsed and erected states and maintain its dimension stability when extended and faithfully fold on its predetermined lines when collapsed. More importantly, throughout its cycle life, the bellows must remain light-tight and not develop pin holes or light-transmitting cracks along the fold lines or in areas of stress such as its points of connection to the main camera housing.

From a manufacturing and cost standpoint, the choice of bellows becomes a difficult one. The material should be relatively inexpensive; easy to use in terms of the manufacturing techniques employed to establish the fold lines; it should not take a "set" after long periods of remaining in either the collapsed or erected state and thereby impairing its ability to be folded or maintain its dimensional stability; and it should be able to meet its design criteria while operating in relatively cold and hot temperatures.

There are also certain desirable features that make a folding camera employing a bellows easier and more enjoyable to use. For example, the bellows should be automatically erected and collapsed when the user extends and folds the camera housing or body. That is, the user should not have to go through a two-step process of 1) extending the camera body and then 2) erecting and latching the bellows, or 1) unlatching and partially or fully collapsing the bellows and then 2) folding the camera body.

U.S. Pat. No. 3,678,831, issued to James G. Baker on July 25, 1972 and assigned to the same assignee as the present invention, discloses a compact, folding, reflex camera of the "self-developing type."

The foldable housing includes four sections pivotally interconnected in a four-bar linkage for movement between a compact folded position and an extended position wherein the four sections are spaced from one another. The space between the four erected sections is enclosed by an extensible molded rubber bellows which excludes extraneous light from an optical path that traverses the space between the erected housing sections. Appropriate openings are provided in the bellows to allow light transmission between the objective lens, a reflex viewing device, and the film exposure plane.

While the bellows functions extremely well, it does not meet the criteria for low cost and ease of manufacture. For one thing, the bellows is complex in shape (an irregular hexahedron) and is molded with a wall thickness of 0.008 inches. The bellows wall includes a plurality of integrally molded fold lines which permits the side and forward walls of the bellows to fold accordian style when the housing is moved to its folded position.

In order to fold easily and occupy an absolute minimum of space when collapsed, the walls of the rubber bellows are extremely thin. This in itself makes the bellows difficult and expensive to mold. The major manufacturing cost is attributable to the complex shape of the bellows. Molding is accomplished by injecting rubber between superposed male and female mold sections that define the shape of a partially erected bellows. The spacing of the mold sections is critical because of the requirement to form very thin walls. More importantly, this manufacturing technique does not readily lend itself to high speed and automated techniques. The bellows are formed one at a time and volume manufacturing is obtained by adding more moldings and injection machines.

As disclosed in the previously mentioned U.S. Pat. No. 3,678,831, the folded bellows occupies a thin space between superposed folded housing sections of the camera. When folded, it also must arrange itself around a movable reflex member normally positioned in overlying relationship to the camera's film exposure plane. When the camera is erected, the walls are extended and assume a substantially planar configuration to provide internal clearance for movement of the reflex member. Thus it is desirable to have the bellows walls stretch slightly when erected to assume their planar configuration. However, the stretch must be controlled so that the bellows walls do not exert a significant compression force on the camera housing what may distort the shape of the erected camera or make it difficult for the user to bring the camera to its fully extended configuration.

The present invention provides a bellows that meets both the performance criteria and low manufacturing cost. Basically, it comprises a flat sheet of flexible material which may be folded into the complex shape and joined along opposite edges to form the bellows.

The prior art discloses bellows which are formed from one or more sheets of flexible material (See U.S. Pat. No. 3,375,767 and 3,706,267). However, the prior art bellows of this type generally requires that predetermined fold lines (or members which define fold lines) be molded or pressed in during the manufacturing process. This, in turn, requires a complicated and costly manufacture step. Close manufacturing tolerances must be maintained so that the bellows walls match that camera housing to which it will be coupled.

SUMMARY OF THE INVENTION

The present invention provides a folding camera which features a novel, low-cost, bellows.

In a preferred embodiment, the bellows is formed from a single, flat, pre-shaped blank of flexible light-opaque material which has oriented stretch characteristics. By using the stretch orientation of the material in combination with a novel pre-shaped member (retainer) for attaching the leading end of the bellows to one of the movable camera housing sections, the bellows may be made to automatically fold, accordian style, along two pairs of fold lines on opposing sides of the bellows in response to moving the camera from its extended position towards its folded position.

This unique structure eliminates the need for molded or permanent crease fold lines or internal stiffening panels to establish such fold lines.

More importantly, the double fold allows the collapsed bellows to be stored to the lateral sides of the superposed mirror and reflex member in the folded camera. This collapsed configuration is different from a single fold bellows disclosed in the commonly assigned copending application of Lawrence M. Douglas, U.S. Pat. Ser. No. 429,022 filed on even date herewith, which requires that the mirror be mounted for movement between an operative position wherein it is spaced at a given distance from the third housing section of the camera and an inoperative position wherein it is closer to the third housing section to provide sufficient storage space between the mirror and reflex member for the collapsed single fold bellows.

The bellows material has minimum stretch characteristics along a first set of orthogonal axes and maximum stretch characteristics along a second set of orthogonal axes oriented at a predetermined angle of rotation (preferably 45°) with respect to the first set of axes. A preferred material is a rubberized woven fabric having minimum stretch in the directions of the warp and woof fibers and maximum stretch in the directions of the fabric's bias (diagonally at 45° to the warp and woof fibers).

The bellows is symmetrical in shape and, when formed, includes an opposing pair of walls. These opposing pair of walls define a pair of spaced side walls and a forward section (a hollow enclosure) of the bellows, extending forwardly of the side walls.

The bellows is coupled between movable housing sections of the camera which induce tension forces in the opposing walls in response to moving the camera from its extended position to its folded position.

The fabric forming the bellows is oriented so that the tension forces are applied in the general direction of one of the axes of maximum stretch.

The bellows retainer that couples the bellows to one of the movable camera housing sections has a distinctive shape. It is generally triangular but has protrusions on the inclined sides of the triangle which direct the tension forces along a predetermined pair of lines on each of the opposing walls of the bellows to establish a pair of fold lines on each opposing wall along which the bellows folds to assume its collapsed position in response to moving the camera from its extended position to its folded position.

The use of an inexpensive blank of flexible material substantially reduces the materials cost in relation to the molded rubber bellows disclosed in U.S. Pat. No. 3,678,831. The assembly technique of adding retainers for attaching the bellows to the camera before the bellows assumes its final form readily lends itself to a highly automated, high production rate process — again providing significant manufacturing cost reductions.

Therefore it is an object of the present invention to provide a folding camera which features a novel, low-cost, collapsible and erectable light-excluding bellows.

It is another object to provide a bellows which may be folded by inducing and directing tension forces along predetermined lines of opposing walls of the bellows to establish a pair of fold lines in each opposing wall.

It is yet another object of the invention to direct such tension along the predetermined lines by employing a bellows material having oriented stretch characteristics and using the oriented stretch in combination with a pre-shaped retainer plate for coupling a leading end of the bellows to the camera.

Another object is to provide such a bellows which may be formed from a single, flat, pre-shaped blank of such a material having said oriented stretch characteristics.

Other objects of the invention will in part be obvious and will in part appear hereinafter.

BRIEF DESCRIPTION OF THE DRAWINGS

The novel features that are considered characteristic of the invention are set forth with particularity in the appended claims. The invention itself, however, both as to its structure and its operation together with the additional objects, features and advantages thereof will be best understood from the following description of the preferred embodiment when read in connection with the accompanying drawings wherein:

DESCRIPTION OF THE PREFERRED EMBODIMENT

Figure 1:
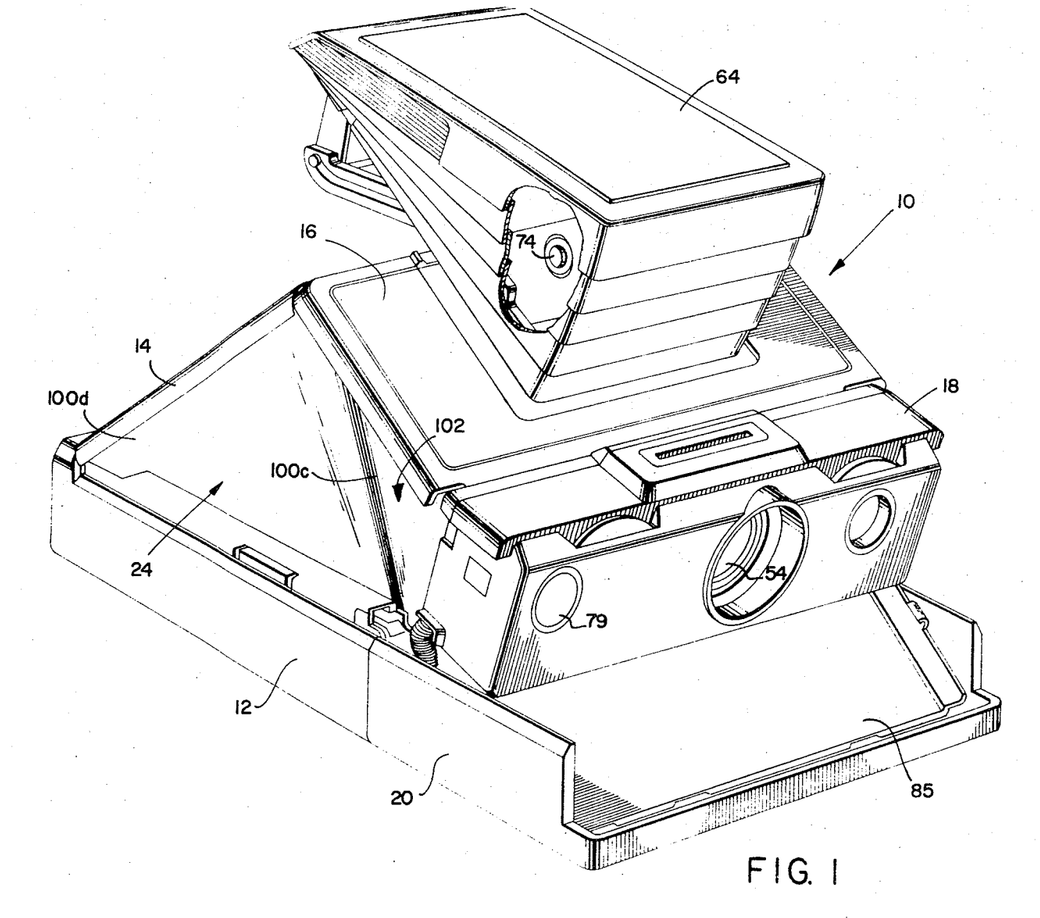
FIG. 1 is a perspective view of a folding, single-lens reflex camera having a light excluding bellows embodying the present invention, said camera being shown in an extended operative position.
Figure 2:
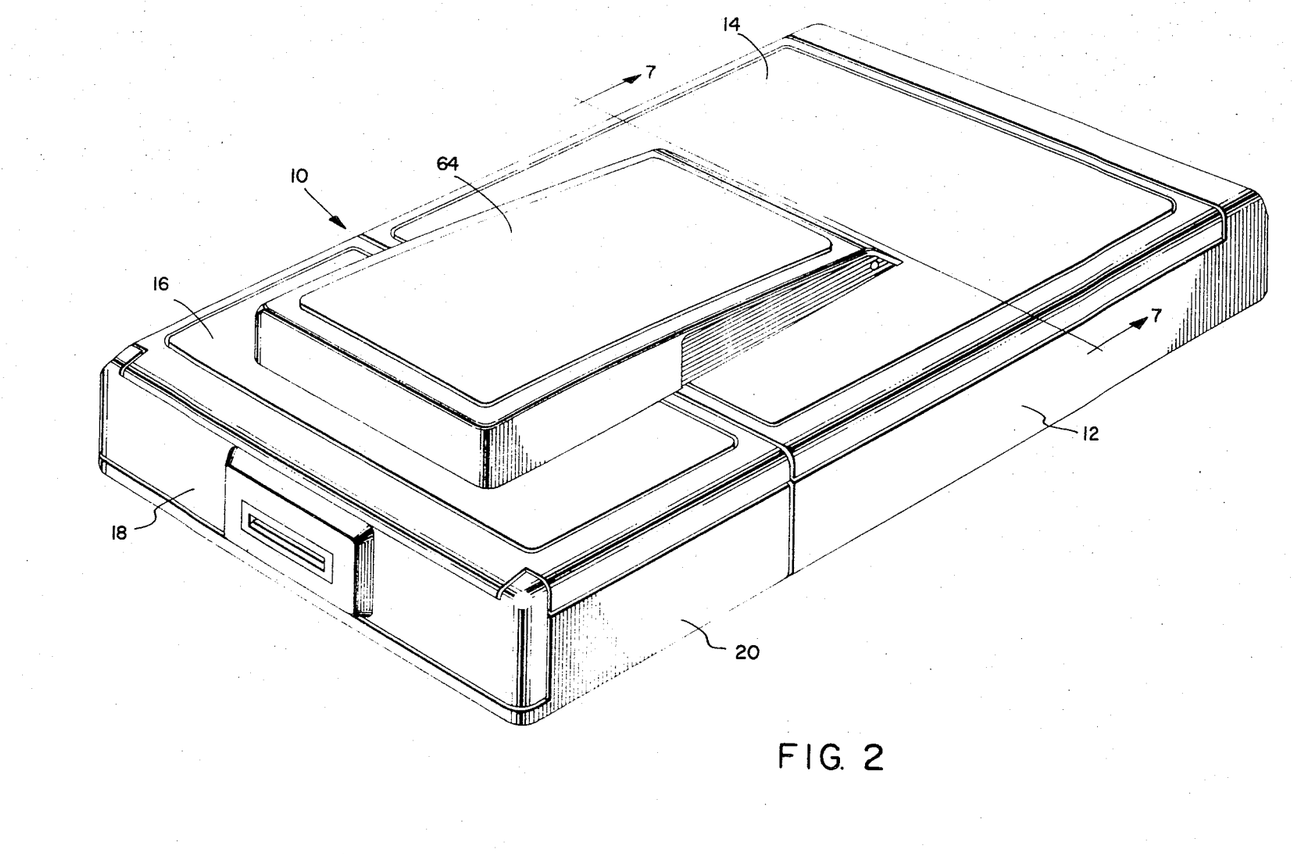
FIG. 2 is a perspective view of the camera of FIG. 1 shown in a compact folded position.
Figure 3:
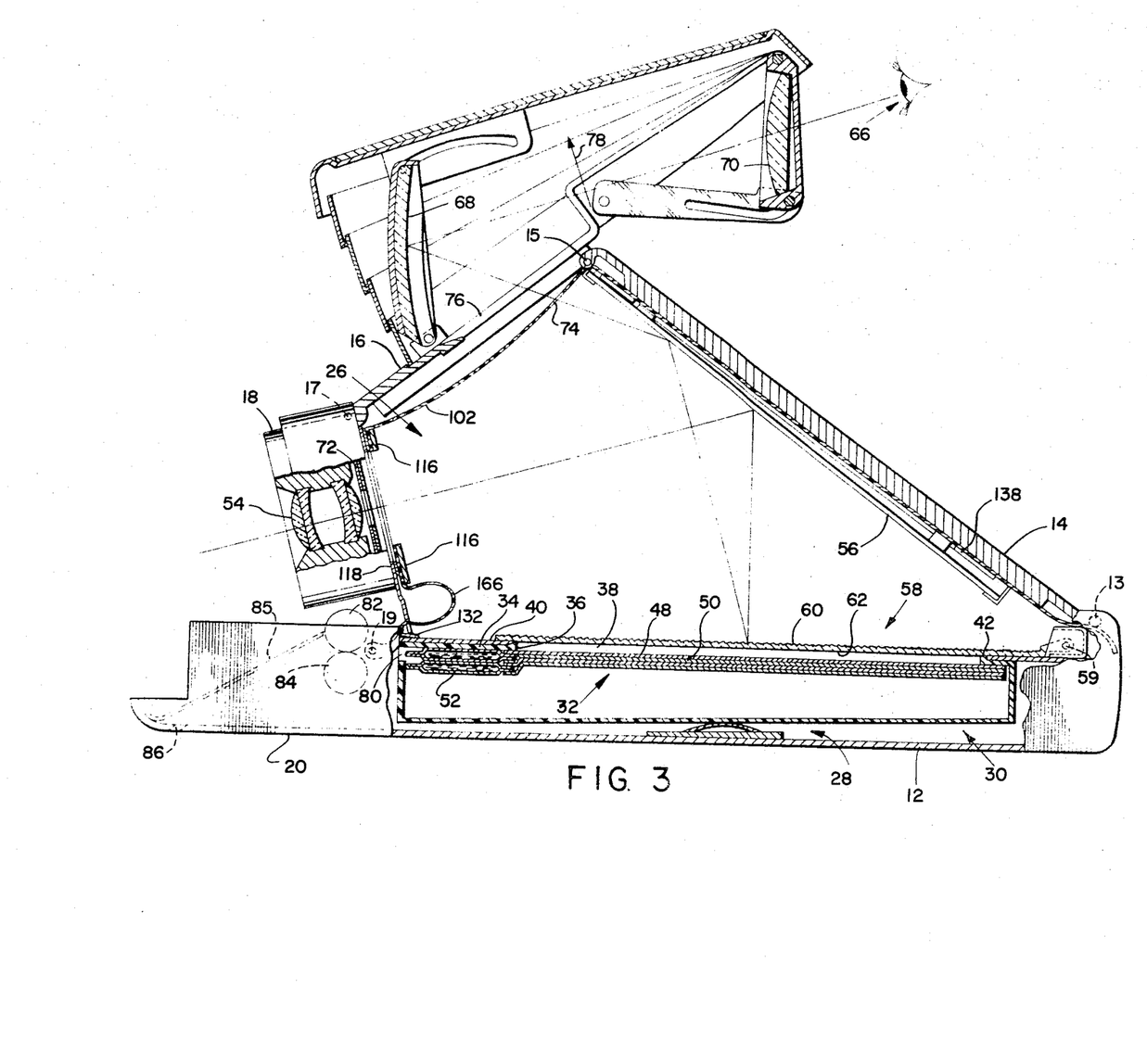
FIG. 3 is a side, elevational view, partly in section, of the camera shown in FIG. 1.

Referring now to the drawings, a compact, folding, single lens reflex camera 10 of the self-developing type is shown in its extended operative position in FIGS. 1 and 3 and its folded compact position in FIG. 2. Camera 10 includes a variable geometry housing formed by five rigid housing sections. Sections 12, 14, 16 and 18 are pivotally interconnected at pivot points 13, 15, 17, and 19 to form a movable four-bar linkage, and section 20 is pivotally coupled to one end of housing section 12.

The four-bar linkage structure permits the geometry of the housing to be converted from the folded inoperative configuration shown in FIG. 2 to the extended operative configuration by rotating housing section 14 in a clockwise direction about pivot 13 (as viewed in FIG. 3) until an erecting link (not shown) coupled between sections 12 and 14 automatically locks to releasably secure the camera in the extended position. Secured to the interior surfaces of housing sections 12, 14, and 18 is a foldable, opaque, envelope or bellows 24 which is automatically unfolded in response to moving the variable geometry housing to the extended position and cooperates with sections 12, 14, 16, and 18 to provide a lighttight exposure chamber 26 within the bounds of the four-bar linkage. The bellows 24 will be described in detail hereinafter.

The first housing section 12 includes a chamber 28 for receiving a film container 30 preloaded with a plurality of film units 32 arranged in stacked relation therein. Access for loading film container 30 into receiving chamber 28 is provided by rotating housing section 20 downwardly in a counterclockwise direction (as viewed in FIG. 3) to expose an open end of chamber 28 located near the interface between housing sections 12 and 20.

Film container 30 includes a forward wall 34 having an upstanding rib 36 which defines the bounds of a generally rectangular light-transmitting section or aperture 38 through which actinic radiation is adapted to pass to expose the forwardmost film unit 32. Film container 30 is supported within chamber 28, at its forward wall 34, by a plate-like support frame 40 having a rectangular opening 42 therein providing communication with the exposure aperture 38 of the film container 30. The forward wall 34 of the film container is securely held against support frame 40 by means of a support spring 44 secured to the interior surface of the bottom wall of housing section 12 and adapted to engage a rear wall 46 of the film container.

Film unit 32 preferably is an integral unit comprising a plurality of superposed layers (including photosensitive and image-receiving layers) and a supply of fluid processing composition that is adapted to be distributed, subsequent to exposure, between a predetermined pair of layers to initiate a development and diffusion transfer process. The film unit 32 is diagrammatically illustrated as including upper and lower superposed elements 48 and 50 and a rupturable container 52 at one end of elements 48 and 50 holding the supply of fluid processing composition. It will be understood that the interface between the elements 48 and 50 is meant to represent the interface between a predetermined pair of layers in film unit 32.

A more detailed description of film unit 32 may be found in U.S. Pat. No. 3,415,644 issued to E. H. Land on Dec. 10, 1968.

The camera's optical system includes an objective lens 54, mounted in housing section 18, for forming an image of the scene to be photographed; a planar mirror 56, coupled to an interior wall of housing section 14, for reflecting light passing through objective lens 54 towards the exposure plane; and a plate-like reflex member 58, pivotally coupled to housing section 12 at pivot 59 for movement between a viewing and focusing position, shown in FIG. 3, and an exposure position adjacent to and parallel with the fixed planar mirror 56. Reflex member 58 has a viewing surface or focusing screen 60 on one side for displaying the image formed by objective lens 54 via reflection from planar mirror 56, and a planar reflective surface 62 on the other side, the function of which will be described hereinafter. The optical system further includes a foldable viewing device 64 for viewing the image displayed on focusing screen 60 from an eye station 66. Thee optical portion of viewing device 64 is formed by a curved mirror 68, and eye lens 70 and an entrance pupil or aperture 74 formed in bellows 24.

Camera 10, being of the single lens reflex type, is configured to operate first in a viewing and focusing mode of operation and thereafter in an exposure and processing mode. As best seen in FIG. 3, during the viewing and focusing mode of operation, reflex member 58 rests atop support frame 40 and light-seals opening 42 and the film container exposure aperture 38. A normally open shutter 72, mounted between objective lens 54 and an opening in bellows 24, permits light to pass through the lens 54 and across chamber 26 until it impinges upon mirror 56 which is positioned by housing section 14 to reflect the light onto the focusing screen 60 to form an image of the scene to be photographed. Focusing screen 60 may take the form of an echelon type mirror as diagrammatically illustrated in FIG. 3. Light emanating from the image on focusing screen 60 is reflected upwardly toward planar mirror 56 from which it is reflected toward housing section 16. The light then passes through the small aperture 74 in bellows 24 which defines the entrance pupil for the viewing device 64 and then through a larger aperture 76 in housing section 16 until it impinges upon curved mirror 68. Mirror 68 has a concave ellipsoidal shaped reflective surface which reflects the light rearwardly toward eye station 66 and forms a real, erect, and unreverted aerial image designated by a vertical arrow 78. The eye lens 70 serves to magnify the image at 78 to facilitate viewing and focusing from the eye station 66.

In operation, the photographer views the aerial image 78 through eye lens 70 while adjusting objective lens 54 until it is in sharp focus. Once the image is in sharp focus, the photographer actuates a shutter release button 79 (See FIG. 1) on housing section 18 which is operative to initiate the following sequence of operations. First, the normally opened shutter 72 closes and reflex member 58 is pivoted upwardly about pivot 59 to the exposure position adjacent to and parallel with the fixed mirror 56. A blocking member (not shown) attached to the movable end of reflex member 58 blocks the entrance pupil 74 of viewing device 64 thereby causing exposure chamber 26 to assume a light-tight condition. Shutter 72 is then opened to admit light into exposure chamber 26. The light is reflected from the planar reflecting surface 62 on the underside of reflex member 58 onto the forwardmost film unit 32 thereby causing exposure of the film unit. After an appropriate exposure interval, the shutter again closes and reflex member 58 is pivoted downwardly to its viewing and focusing position. Once reflex member 58 caps opening 42 and the exposure aperture 38 in the forward wall 34 of the film container, shutter 72 is opened and the optical system assumes its viewing and focusing mode.

As reflex member 58 is being returned to its viewing and focusing position, the exposed forwardmost film unit is automatically advanced, by means not shown, forwardly through a withdrawal slot 80 in the leading end wall of film container 30 and into engagement with a pair of pressure applying rollers 82 and 84 mounted in housing section 20. Rollers 82 and 84 are adapted to be rotatably driven (by a camera mounted motor and drive train, not shown) in a direction to advance the exposed film unit 32 therebetween toward the exterior of camera 10. As the exposed film unit passes between rollers 82 and 84, they apply compressive pressure to the film unit which causes pod 52 to rupture and dispense the processing fluid which is then uniformly distributed between the predetermined pair of layers to initiate the diffusion transfer process. A light shield 85, in front of the rollers, deflects the film unit downward and it exits from the camera through an opening 86 in the bottom wall of camera housing section 20.

The preceding has been a brief description of the structure and operation of folding reflex camera 10 to provide the necessary background for a description of th novel low cost collapsible and erectable bellows 24.

As described earlier, the low cost bellows 24 of the present invention is intended to replace the hollow, thin walled, molded rubber bellows described in U.S. Pat. No. 3,678,831. Rather than molding the bellows to its final shape, the novel low cost bellows 24 is initially cut or stamped to form a pre-shaped blank from a single sheet of flat, flexible light-opaque material. After the addition of certain internal members to the pre-shaped blank for coupling the bellows 24 to the camera housing, the flat bellows is folded or formed and certain mating edges are bonded together.

One analogy to the method of construction is the making of cloth garments. The individual sections of the garment are reduced to flat patterns or templates for cutting the cloth sections which are then sewn together. However, in this application, a complex shaped bellows 24 (see FIGS. 6 and 8) has been reduced to a single, pre-shaped planar pattern, requiring only forming and then joining certain mating edges to form the final bellows.

The pre-shaped starting blank 104 (see FIG. 4) is cut or stamped from a thin, flexible and light-opaque material such as a rubberized woven fabric. In a preferred embodiment, the fabric is a square weave of cotton or synthetic fiber as shown in the magnified view of FIG. 4b. In a square weave, the warp fibers 105 (attached longitudinally to the loom) alternate in a simple over-and-under pattern with the woof fibers 106 (passed laterally over and under alternating warp fibers 105 by the shuttle) to form squares. Such a weave is characterized by its oriented stretch characteristics.

Figures 4, 4A, 4B:
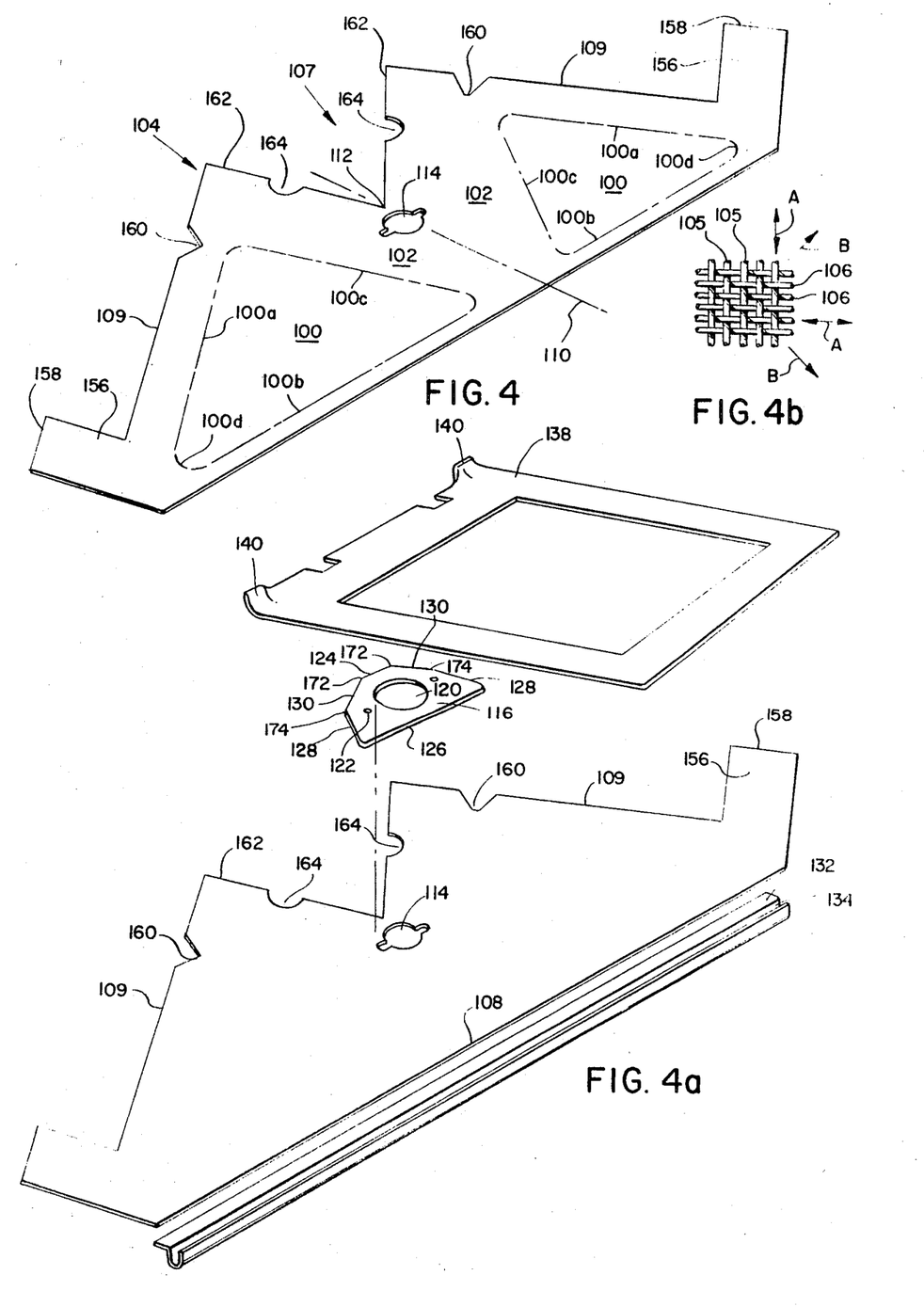
FIGS. 4 and 4a are perspective views of the component parts of a light excluding bellows embodying the instant invention.
FIG. 4b is a magnified view of a small section of the flexible fabric material forming the pre-shaped bellows blank of FIG. 4 to show the warp and woof fibers of the fabric.

Minimum stretch is in the directions of the orthogonal axes A which coincide with the orthogonally intersecting warp and woof fibers 105 and 106. Maximum stretch is in the direction of a second set of orthogonal axes B which run with the bias or diagonals of the fabric at an angle of rotation of 45° from the minimum stretch axes A.

One suitable material for the bellows is a square weave rubberized cotton. The rubber coating is of neoprene rubber and the thickness of the coated fabric is approximately 0.008 inches. It is sold commercially by the Plymouth Rubber Co., of Canton, Mass., under the designation of catalog number 4056.

While the above material performs well, it is expected that other light-opaque materials, such as a fiber re-inforced plastic, that have the same or substantially similar minimum and maximum oriented stretch characteristics and flexibility may be used in place of the above-described rubberized fabric.

As will be described later, the pre-shaped blank is cut with the stretch axes A and B in mind so that the minimum and maximum stretch directions are correctly oriented on the finished bellows.

Figure 6:
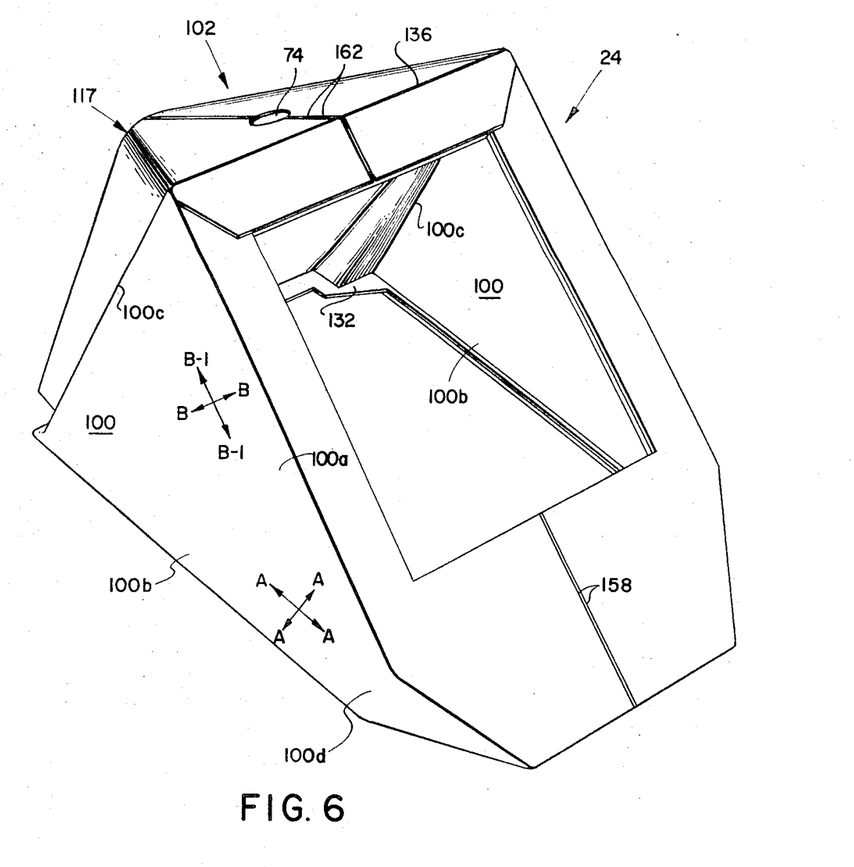
FIG. 6 is a perspective view showing the exterior of an erected bellows embodying the instant invention.
Figure 8:
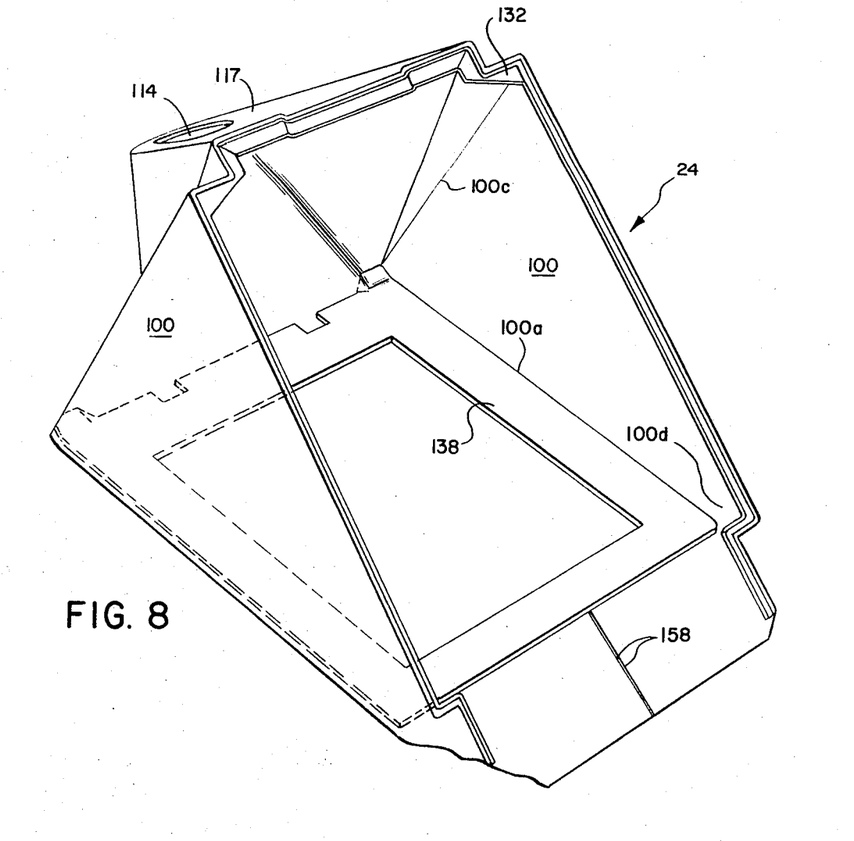
FIG. 8 is a perspective view of the interior of the erected bellows shown in FIG. 6.

As best shown in FIGS. 1, 6 and 8, the erected bellows 24 includes a pair of laterally spaced planar side walls 100 for enclosing the space between housing sections 12 and 14 and a forwardly extending portion or section 102 (a hollow enclosure) for enclosing the optical path from the leading edges of side walls 100 to the rear of the objective lens 54 mounted in camera housing section 18.

The initial blank 104 generally resembles a truncated, equilateral triangle having an inverted V-notch 107 at its top side pointing towards a substantially linear base or bottom edge 108. Between the base 108 and the notch 107 are a pair of inwardly inclined side edges 109. At right angles to base 108, and passing through its center, is an axis of symmetry 110 that divides blank 104 into mirror image right and left hand sections. Centered on axis 110 just below the apex 112 of notch 106 is an opening 114 that will be positioned behind and in alignment with camera objective lens 54 to allow image-bearing light to pass into the camera chamber 26.

FIG. 4a is a view of blank 104 that will eventually be the interior surface of the assembled fabric bellows 24. In order to more clearly visualize how the fabric bellows 24 is constructed, the left and right hand mirror image and opposed spaced areas of blank 104 that define the bellows side walls 100 are shown in dotted lines as generally wedge shaped areas. That portion of the blank 104 therebetween will define the forwardly extending section 102.

The mirror image, wedge shaped side wall defining areas are located between the bottom edge 108 and the inclined side edges 109 of blank 104. The top, bottom and leading edges of side walls 100 are designated, respectively, 100a, 100b and 100c. A trailing end corner of side wall 100, opposite leading edge 100c, is designated 100d. Those portions of blank 104 adjacent to top and bottom edges 100a and 100b, along side edges 109 and bottom edge 108 of blank 104 will be used to mount means for coupling the bellows side walls 100 to camera 10.

The first step in making the fabric bellows 24 from the fabric blank 104 is the attachment of retainers used to couple the assembled bellows of FIGS. 6 and 8 to camera 10. Unless otherwise specified, the retainers, are preferably metal stamping from sheet stock of 0.050 stainless steel or some other suitable material.

As best shown in FIG. 4a, the first retainer 116 secures the leading end 117 of forwardly extending section 102 of bellows 24 to a rear planar wall 118 of camera housing 18. In a preferred embodiment, retainer 116 is a flat, metal, six-sided flange having a circular opening 120 therein. On opposite sides of opening 120 are a pair of mounting holes 122 through which appropriate fasteners, such as screws or rivets, extend to couple retainer 116 to the rear wall 118 of camera housing 18 with the leading end 117 of bellows 24 held therebetween.

In addition to coupling the leading end 117 of the bellows 24 to camera housing 18, retainer 116, by its shape, establishes fold lines in the flexible fabric of the bellows and eliminates the need for molded fold lines, or creases, or separate stiffener to accomplish folding the bellows along predetermined lines in response to folding camera 10.

This function will be described in detail later in the disclosure. It is, however, desirable at this point to numerically designate the outer edges of retainer 116 as parallel upper and lower edges 124 and 126, respectively, side edges 128 extending upwardly and inwardly from bottom edge 126 and further inwardly inclined edges 130 joining the ends of upper edge 124 with side edges 128.

In a preferred embodiment, retainer 116 is attached to the interior surface of blank 104 with its circular opening 120 in alignment with the lens opening 114 in blank 104. The retainer may be attached with a double sides adhesive tape, a liquid cement, or other suitable bonding agents. When attached, the upper and lower edges 124 and 126 are normal to axis of symmetry 110, and edges 128 and 130 are disposed at predetermined angles of intersection with the axis 110.

The bottom edge of the assembly bellows 24 of FIGS. 6 and 8 is attached to camera housing section 12 by means of a substantially three-sided retainer 132 (see FIG. 8). Initially, a retainer 132 is an elongated and thin, metal strip having a channel 134 into which the bottom edge 108 of the blank 104 is inserted. The channel 134 is then compressed to hold edge 108. In a later step, diagrammatically shown in FIG. 5, retainer 132 will be formed into the three-sided structure shown in FIG. 8.

The top edges 100a of side walls 100 and the trailing upper edge 136 of the forward section 102 are coupled to the interior surface of camera housing section 14 by a generally rectangular retaining plate 138. Plate 138 includes a pair of integrally formed down-turned (as viewed in FIG. 8) flanges 140 at its leading end lateral corners. As will be described later, flanges 140 serve to clearly define the leading edges 100c of the erected bellows and maintain these edges 100c out of the path of travel of lateral edges of the plate-like reflex member 58 as it moves between its viewing and focusing, and exposure positions within camera chamber 26.

With the retainers 116 and 132 attached to the flat blank 104, the bellows 24 is transferred to a die forming machine to form retainer 132 into a three-sided structure of FIG. 8. The die forming process is diagrammatically illustrated in FIG. 5 of the drawings.

Figure 5:
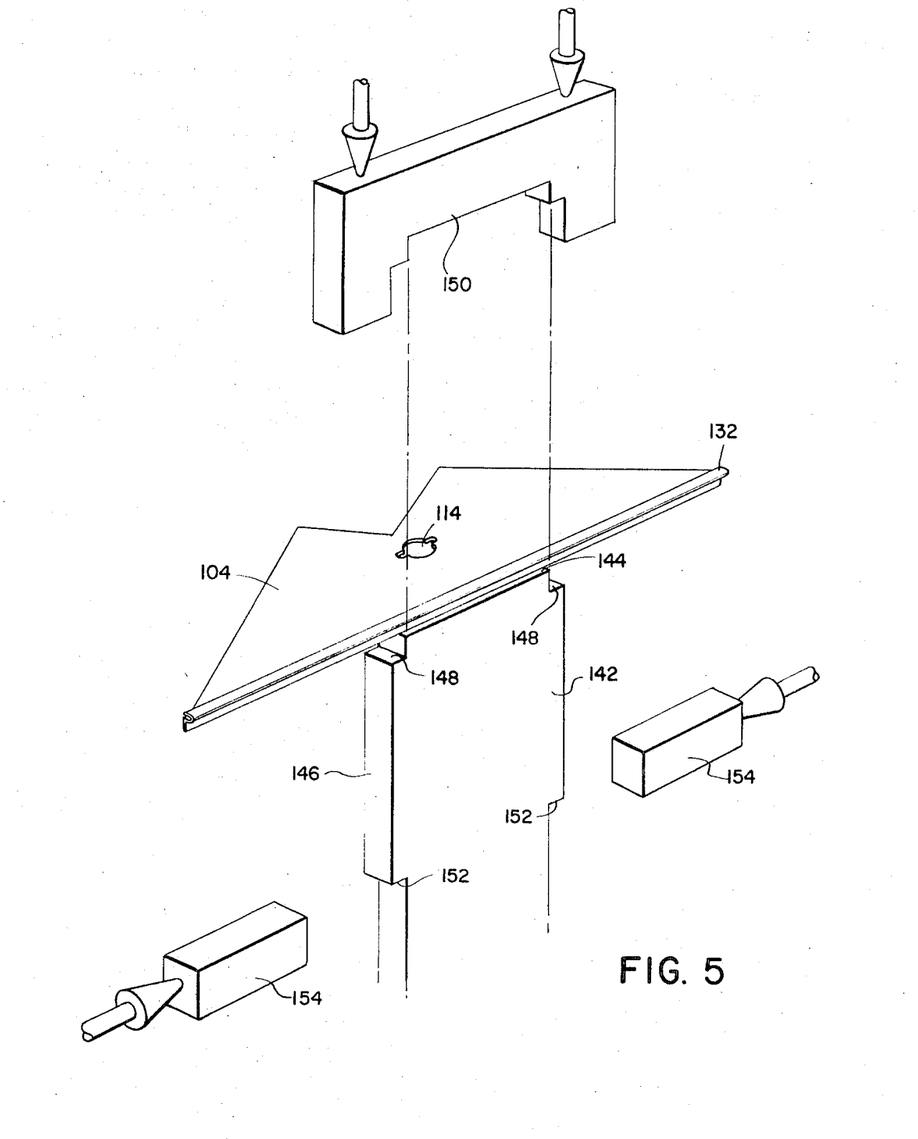
FIG. 5 is a diagrammatic illustration of a die forming process for blending a bellows retainer.

A form 142 includes a top planar surface 144 and a pair of side surfaces 146. The transition between surfaces 144 and 146 includes a pair of right angle relief sections 148.

Retainer 132 is centered on surface 144 and a conforming die piece 150 is hydraulically driven downwardly over form 142 to bend retainer 132 into a shape conforming with surfaces 144 and 146 and relief sections 148. The lateral sides of retainer 132 now extend along surfaces 146 and below a pair of lower right angle relief sections 152 on form 142. The trailing ends of the lateral sides are then hydraulically formed by lateral die members 154.

The formed shape of retainer 132 is best shown in FIG. 8 of the drawings. The right angle indentations formed by relief sections 148 and 152 are provided to conform to structure in camera housing section 12 where retainer 132 is attached thereto.

Once the retainer 132 has been formed, opposing mating edges of the bellows are joined together and retainer 138 is attached.

As best shown in FIG. 4a, the inclined side edges 109 each include a bottom outwardly extending rectangular tab 156 having an outermost edge 158 and a V-notch 160 that deliniates the top edge 100a of side walls 100 from the forwardly extending portion 102 of bellows 24.

The V-notch 107 at the top of the bellows is defined by edges 162 that are symmetrically disposed with respect to the axis 110. Each edge 162 includes a half-round notch 164 therein in mirror image relation to one another.

Retainer 138 is adhesively attached to blank 104 in the position shown in FIG. 8 with the outermost edges 158 of tabs 156 in side-by-side abutting relation to form a trailing end centerline seam of bellows 24. This seam may be held together with an adhesive tape (not shown).

The edges 162 are brought into side-by-side abutting relation, to close V-notch 107, and form a leading end centerline seam in the forwardly extending section 102 of bellows 24. When this seam is formed, the half-round notches 164 in edges 162 cooperate to form the circular viewing device entrance aperture 74.

As best shown in FIG. 6, the fabric is oriented such that the minimum stretch orthogonal axes A run vertically and horizontally on the bellows side walls 100, i.e., the vertical axis A is substantially normal to the horizontal bottom edge 100b of each side wall 100. This automatically orients the maximum stretch axes B at an angle of rotation of 45° with respect to axes A. The axis B that is of the most interest in establishing the fold lines is the axis B that runs in the general direction of a line extending between the lens opening 114 at the leading end 117 of the erected bellows and the trailing end corner 100d of bellows side walls 100. This axis is designated B-1 in FIG. 6.

The assembled fabric bellows 24 is attached to the camera 10 by means of the three retainers. Retainer 116 couples the leading end 117 of forward section 102 to the rear wall 118. The lower periphery of the bellows is secured to the support plate 40 by retainer 132. The upper inwardly turned edges 100a of the bellows side walls 100 are secured to the interior surface of housing section 14 by means of retainer plate 138.

The down-turned flanges 140 serve to hold the leading edges 100c of side walls 100 taut when the camera is located in its extended position. The roundness of flanges 140 prevent the leading end corners of retainer 138 from stressing and possibly tearing the fabric.

FIG. 3 shows that the portion of forward section 102 that includes the viewing device entrance pupil 74 is not attached to the camera housing section 16. This arrangement permits the camera 10 and bellows 24 to be folded to the position of FIG. 2. It will be noted that the fabric is somewhat slack at this point. This permits the bellows 24 to be folded flat without excessively stretching the fabric along axis B-1. An excess or fold 166 of cloth is provided at the bottom of the forwardly extending portion 102 for the same purpose. While fold 166 does extend into camera chamber 26, it does not intrude in the optical path.

Figure 9:
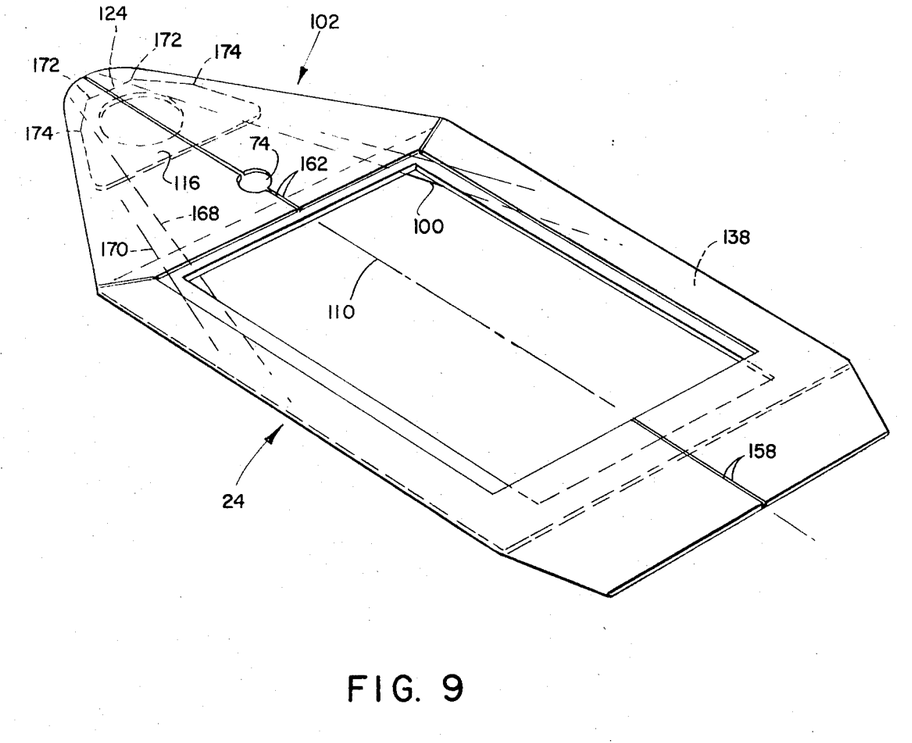
FIG. 9 is a perspective view of the bellows shown in its collapsed configuration.
Figure 10:
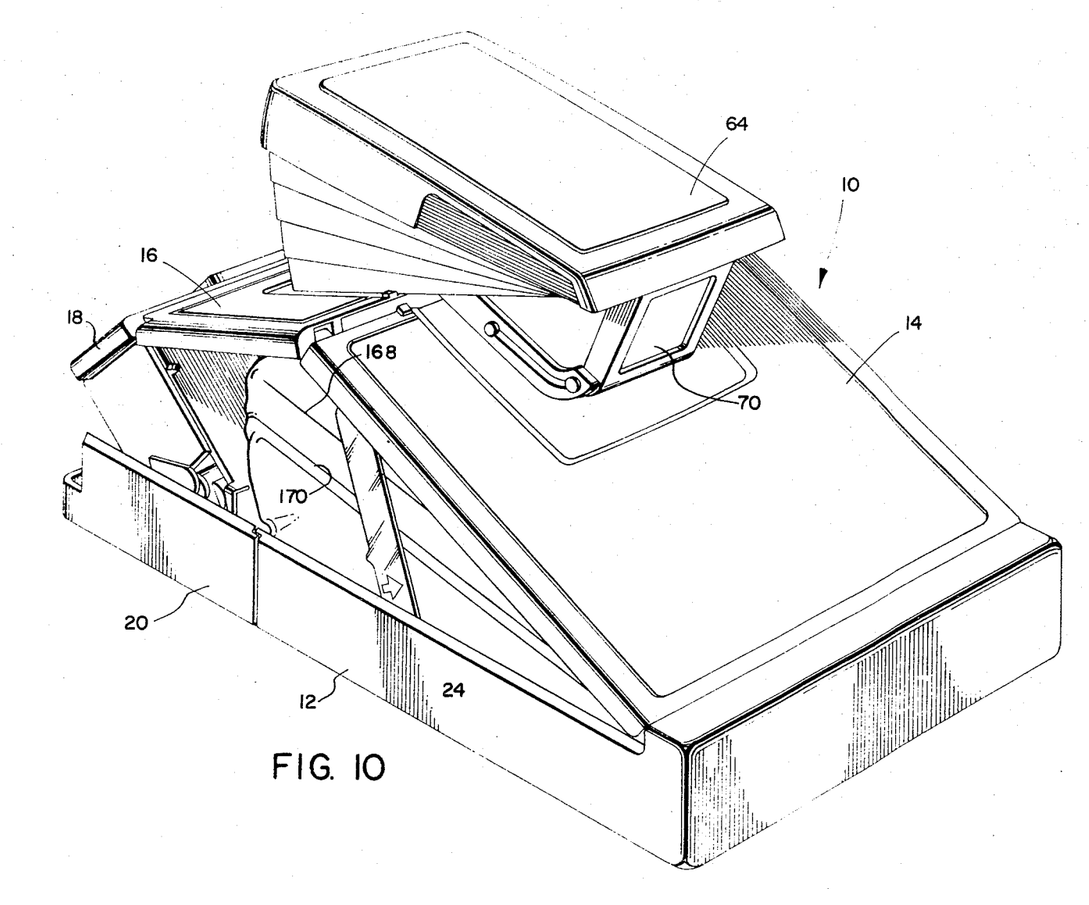
FIG. 10 is a perspective view of the camera, in a partially folded state, to illustrate the fold lines along the sides of the bellows which are established in response to moving the camera from the extended position of FIG. 1 to the folded position of FIG. 2.

As camera 10 is moved from the extended position towards the folded position, the bellows 24 automatically begins to assume its folded or collapsed configuration (shown in FIG. 9 of the drawings). As best shown in FIG. 10, the sides of the bellows fold inwardly, accordian style, along double fold lines 168 and 170 extending from the trailing end, and laterally spaced corners 100d of side walls 100 forwardly and inwardly along side walls 100 through the approximate middle of forward section 102 to the bellows retainer 116.

Figure 7:
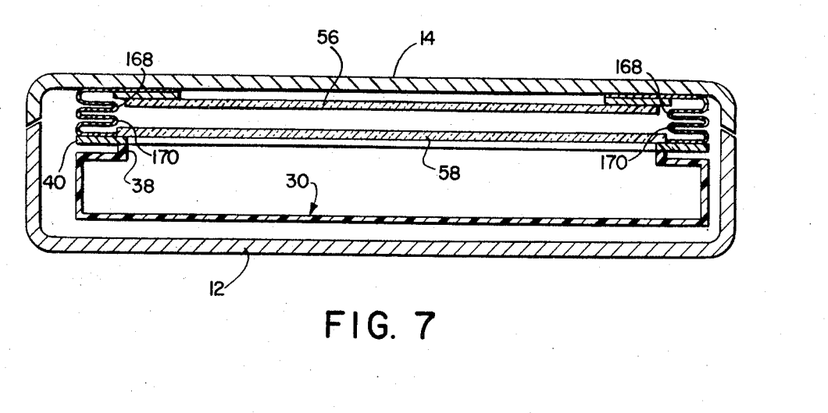
FIG. 7 is a cross-sectional view of the folded camera taken along lines 7—7 of FIG. 2.

As best shown in FIG. 2, housing sections 14 and 16 are located in overlying relation to housing sections 12 and 20 when the camera is folded. It is between these opposing upper and lower housing sections that the collapsed bellows shown in FIG. 9 is stored. As best shown in FIG. 7, the inwardly folded side walls 100 (folded twice along lines 168 and 170) are located and stored outboard of the lateral edges of the mirror 56.

It will be noted that even though the bellows 24 is formed of a flexible fabric, it reliably folds along fold lines 168 and 170 without having permanent creases or molded fold lines in the sides of the bellows.

The fold lines 168 and 170 are established by inducing a slight tension in the opposing sides (to either side of the centerline seams) of the fabric bellows 24 along predetermined lines 168 and 170 in response to moving the extended camera 10 towards its folded position. The tension induces the inward accordian folds. Once the tension or fold lines are established, it is the compressive force on the upper and lower edges of the fabric bellows applied by the camera housing sections moving towards one another that do the actual folding.

From FIG. 9, it will be noted that the bellows 24 is symmetrical with dotted line 110. When erected, as in FIGS. 6 and 8, the bellows is symmetrical with respect to the imaginary plane of symmetry which bisects the bellows longitudinally along the center line seams, formed by abutting edges 158 and abutting edges 162, and bisects aperture 74 and leading end opening 114, said plane of symmetry also being normal to a plane containing the bottom peripheral edges of the bellows defined by formed retainer 132.

When attached to camera 10, the plane of symmetry of the erected bellows coincides with a plane of symmetry of the camer's optical system. In FIG. 3, the camera optical path is diagrammatically illustrated as a dotted line showing the path followed by a light ray passing through the optical center of objective lens 54. This dotted line is in the vertical plane of symmetry of the camera's optical system, said vertical plane being substantially normal to a horizontal plane container the plate-like reflex member 58.

As camera 10 is moved from the erected position of FIGS. 1 and 3 to the folded position of FIG. 2, housing sections 18, 16 and 14 moves as a single unit. Housing section 18 pivots about pivot 19 in a counterclockwise direction (as viewed in FIG. 3) and moves into housing section 20 in front of rollers 82 and 84. Baffle plate 85 is pivotally mounted and is depressed by housing section 18 to a position parallel to the bottom wall of housing section 20.

The counterclockwise movement of housing section 18 causes housing section 16 to pivot in a clockwise direction about pivot 15 and housing section 14 to pivot downwardly in a counterclockwise direction about pivot 13.

When camera 10 is fully extended, the distance between camera pivots 13 and 17 (or the top edge of camera housing 18) is at a minimum in the coinciding planes of symmetry of the bellows 24 and the optical system. As the camera is folded, and housing section 18 pivots about pivot 19, the distance between pivots 13 and 17 increases until it reaches a maximum when housing section 18 is in its final folded position.

By attaching the leading end 117 of bellows forward section 102 to the rear wall 118 of camera housing section 18 with retainer 116, the increase in distance between pivots 13 and 17, as the camera is folded, is exploited to direct tension along lines 168 and 170 to cause the accordian type folds.

More specifically, it will be noted that the top horizontal and planar edge 124 of retainer 116 is closest to pivot point 17 and is normal or transverse to the planes of symmetry passing through its midpoint. Therefore, the distance increase between edge 124 and pivot 13 is greater than the distance increase between the lower horizontal edge 126 and pivot 13. Rather than describe the relation of retainer 116 with respect to pivot point 13, it will be more beneficial to think of the relationship of retainer 116 with respect to the trailing end corners 100d of bellows side walls 100 which are located just forwardly of pivot point 13.

Since the top edge 124 of retainer 116 is closest to pivot 17, the fold lines or tension lines 168 will be induced in straight lines from edge 124 to the trailing end corners 100d. The upwardly inclined angle of lines 168 with respect to the bottom edges 100b of bellows side walls 100 bears a direct relationship to the proximity of upper edge 124 and pivot 17. Thus, one may control the elevation of lines 168, with respect to the bottom edges 100b by controlling the spacing between pivot 17 and the upper edge 124 of retainer 116.

The inward inclination or angle of lines 168 with respect to the vertical plane of symmetry is controlled by the length of the upper edge 124 as measured between the upper corners 172 of retainer 116 at the intersection of edges 124 and edges 130. Thus, the fold lines 168 are established between the trailing end corners 100d of side walls 100 and the upper corners 172 of retainer 116.

The second or bottom fold line 170 is formed in much the same manner but by protrusions of protruding corners 174 of retainer 116 at the intersection of edges 128 and 130. Corners 174 are symmetrical with respect to the plane of symmetry and are located on an imaginary line that is substantially normal to the plane. It will be noted that the transverse spacing between corners 174 is greater than the transverse spacing between corners 172. This is to compensate for the fact that corners 174 are located further away from pivot 17 than corners 172.

As mentioned earlier, housing section 18 induces tension forces along the opposing sides of the bellows 24, as it moves towards its folded position, in the general direction of the fabric bias (substantially parallel to axis B-1). The tension forces are directed, by corners 172 and 174 of retainer 116, along the predetermined lines 168 and 170, respectively, to establish the fold lines. Thus, it is the combination of the shape of retainer 116 and the proper orientation of the fabric (see FIG. 6) that cause the double fold lines along opposing sides of the bellows 24 in response to moving the camera 10 from its extended position to the folded position. The actual folding of the bellows 24, along lines 168 and 170 is accomplished by a compressive force applied to the upper and lower edges of the bellows by housing sections 12 and 14.

When bellows 24 is erected, the top and bottom retainers 138 and 132 induce a slight tension on side walls 100 to maintain them in their substantially planar and vertical configuration. The leading end section 102 is shaped by the retainer 116 and the taut leading edges 100c of the bellows side walls 100, said edges 100c being sharply defined and maintained in the vertical plane of the erected side walls 100 by flanges 140. Thus, the fabric along the sides of the erected bellows 24 is depolyed outboard of the direct straight lines between corners 172 and 174 of retainer 116 and the trailing end corners 100d of the bellows side walls 100.

As the camera 10 is folded, the distance between corners 172 and 174, and 100d increases, thereby inducing tension and pulling the outboard fabric in towards the direct lines between corners 172 and 174 and 100d to establish the accordian folds as shown in FIG. 10.

Erection of the camera 10 and bellows 24 is accomplished by reversing the procedure just described.

In summary, a folding camera has been provided which includes a novel, low cost, fabric bellows.

The bellows is characterized by the fact that while it has a complex shape when erected, it may be fabricated from a flat, single, low cost, pre-shaped blank of flexible light-opaque material. Also, the bellows has no molded or permanent crease fold lines. The fold lines are established by a pre-shaped bellows retainer in combination with a fabric having oriented stretch characteristics for directing tension forces applied to the bellows by the folding housing sections of the camera along predetermined lines.

The bellows includes certain retainers which were bonded to a precut blank of starting material. It is within the scope of the present invention to form the retainers integrally with the starting blank. For example, one may choose to make an all plastic bellows having the retainers integrally molded with the pre-shaped blank.

Since certain changes may be made in the above system and apparatus without departing from the scope of the invention herein involved, it is intended that all matter contained in the above description or shown in the accompanying drawings shall be interpreted as illustrative and not in a limiting sense.

What is claimed is:

1. A folding camera comprising:
   a housing including at least first and second housing sections mounted for relative movement between a compact folded position and an extended position wherein said first and second housing sections define a space therebetween;
   optical means for transmitting image-bearing light along an optical path in said space, when said first and second housing sections are located in said extended position;
   a collapsible and erectable bellows formed of a flexible, light-opaque material of the type having oriented stretch characteristics whereby said material has minimum stretch along a first set of orthogonal axes and maximum stretch along a second set of orthogonal axes disposed at a predetermined angle of rotation with respect to said first set of axes;
   said bellows being coupled to said first and second housing sections for movement therewith between a compact collapsed position when said first and second housing sections are in said folded position and an erected position, when said first and second housing sections are in said extended position, wherein said erected bellows defines symmetrical opposing light-blocking walls in said space symmetrically disposed with respect to a plane of symmetry of said optical path for excluding extraneous light from said optical path;
   said bellows and said first and second housing sections being operatively associated such that said first and second housing sections apply tension forces to said erected bellows and said bellows being configured such that said flexible material has one of its axes of maximum stretch oriented in the general direction of said tension forces; and
   means for directing said tension forces along a pair of predetermined lines on each of said opposing bellows walls such that said lines are substantially parallel with said one axis of maximum stretch to define a pair of fold lines in each opposing wall along which said opposing walls fold to assume said collapsed position of said bellows as said first and second housing sections move towards said folded position.

2. A folding camera as defined in claim 1 wherein said flexible material forming said bellows includes a square woven fabric, said first set of orthogonal axes along which said material has minimum stretch characteristics coinciding with the warp and woof of said woven fabric and said second set of orthogonal axes along which said material has maximum stretch characteristics coinciding with the bias of said fabric disposed diagonally with respect to said warp and woof.

3. A folding camera as defined in claim 2 wherein said bellows is formed from a single, flat, pre-shaped blank of said flexible material.

4. A folding camera as defined in claim 2 wherein said square woven fabric is coated with a light-opaque substance.

5. A folding camera as defined in claim 4 wherein said light-opaque substance is rubber.

6. A folding camera as defined in claim 1 wherein said means for directing said tension forces includes means for coupling said bellows to said second housing section.

7. A folding camera as defined in claim 6 wherein said means for coupling said bellows to said second housing section includes a flat, retaining plate, said retaining plate having a predetermined shape and including a first pair of corners thereof symmetrically disposed with respect to said plane of symmetry for directing said tension forces along lines to establish one of said pair of fold lines and a second pair of corners, spaced from said first pair of corners, and disposed symmetrically with said plane of symmetry for directing said tension forces along lines to establish the other of said pair of fold lines.

8. A folding camera as defined in claim 7 wherein said first and second pair of corners lie on lines that are substantially normal to said plane of symmetry and the distance between said second pair of corners is greater than the distance between said first set of corners.

9. A folding camera as defined in claim 1 wherein said bellows is formed from a single, flat, pre-shaped blank of said flexible material.

10. A folding camera as defined in claim 1 further including means in said first housing section for supporting a film unit in position for exposure and wherein said optical means includes an objective lens mounted on said second housing section for transmitting image-bearing light along said optical path to expose a film unit located at said exposure position and wherein said bellows includes a leading end having an opening therein through which light from said objective lens is adapted to pass as said light follows said optical path, said leading end of said bellows being adapted to be coupled to said second housing section with said opening in operative association with said objective lens and said means for directing said tension forces including means for coupling said leading end of said bellows to said second housing section.

11. A folding camera as defined in claim 10 wherein said coupling means includes a retaining plate having a predetermined shape, said retaining plate being coupled to said second housing section, with said leading end of said bellows positioned between said retaining plate and said second housing section, said plate, by its said predetermined shape, having locations thereon which selectively direct said tension forces along said predetermined lines to establish said pair of fold lines in each opposing wall of said bellows.

12. A folding camera as defined in claim 1 wherein said first housing section includes leading and trailing ends and said second housing section is pivotally coupled to said first housing section near its leading end for movement between said extended position wherein said second housing is angularly disposed with respect to said first housing section and said folded position wherein said second housing section assumes a substantially end-to-end relation with said first housing section.

13. A folding camera as defined in claim 1 further including means for applying a compressive force to said bellows as said first and second housing sections move from said extended position towards said folded position to fold said bellows along said predetermined fold lines established by said directed tension forces.

14. A folding camera as defined in claim 13 wherein said means for applying said compressive force includes a third camera housing section coupled to said bellows and said first housing section, near a trailing end thereof, for movement between said folded and extended positions of said camera housing.

15. A folding camera as defined in claim 14 further including a fourth housing section coupled to said second and third housing sections for movement therewith between said folded and extended positions, said first, second, third, and fourth housing sections being pivotally interconnected to form a four-bar linkage.

16. A folding camera comprising:
a housing including first, second, third, and fourth housing sections interconnected as a four-bar linkage for movement between a compact folded position and an extended position wherein said housing sections define a space therebetween, said second and third housing sections being pivotally coupled to said first housing section near opposite ends thereof and said fourth housing section being coupled between ends of said second and third housing sections;
means in said first housing section for locating a film unit in position for exposure;
exposure means including optical means for exposing a film unit located at said exposure position, said optical means including an objective lens mounted on said second housing section for transmitting image-bearing light along an optical path in said space between said extended housing sections, and a mirror mounted on said third housing section in said optical path for directing the light along an extension of said optical path in said space towards a film unit located at said exposure position;
a collapsible and erectable bellows formed of a flexible, light-opaque material cooperating with said first, second, and third extended housing sections for excluding extraneous light from said optical path in said space, said bellows being coupled to said first, second and third housing sections for movement therewith between a collapsed position when said first, second, third, and fourth housing sections are in said folded position and an erected position wherein said bellows defines a pair of substantially planar and parallel spaced side walls extending between said first and third housing sections, each of said side walls having a leading edge, and a forwardly extending portion of the bellows enclosing that portion of the optical path between the leading edges of said bellows side walls and said objective lens mounted on said second housing section;
said bellows being configured such that said first and second housing sections apply tension forces to said bellows along said forwardly extending portion and said side walls in response to moving said first, second, third, and fourth housing sections from said extended position towards said folded position;
said flexible material forming said bellows being of the type having oriented stretch characteristics whereby said material has minimum stretch along a first set of orthogonal axes and maximum stretch along a second set of orthogonal axes disposed at a predetermined angle of rotation with respect to said first set of axes;
said material forming said bellows being orientated such that one of said axes of maximum stretch is orientated in the general direction of said tension forces applied by said first and second housing sections; and
means for directing said tension forces along two pair of predetermined lines of said forwardly extending portion and said side walls such that said two pair of lines are substantially parallel to said one axis of maximum stretch to establish two fold lines on each of opposing sides of said bellows along which said bellows folds to assume said collapsed position in response to moving said first, second, third, and fourth housing sections from said extended position towards said folded position.

17. A folding camera as defined in claim 16 wherein said bellows is formed from a single, flat, pre-shaped blank of said flexible material, and said flexible material includes a square woven fabric having said axes of minimum stretch running with the warp and woof of said square woven fabric and said axes of maximum stretch running with the bias of said fabric, diagonally with respect to said warp and woof.

18. A folding camera as defined in claim 17 wherein said woven fabric is coated with light-opaque rubber.

19. A folding camera as defined in claim 18 wherein said forwardly extending portion of said bellows includes a leading end having an opening therein through which image-bearing light from said objective lens is adapted to pass as said light follows said optical path, said leading end of said forwardly extending portion of said bellows being adapted to be coupled to said second housing section with said bellows opening in operative association with said objective lens and said means for directing said tension forces including a retaining plate having a predetermined shape, said retaining plate being coupled to said second housing section, around said objective lens, with said leading end of said bellows positioned between retaining plate and said second housing section, and said retaining plate, by its predetermined shape, having locations thereon which selectively direct said tension forces along said predetermined lines.

20. A folding camera as defined in claim 19 wherein said erected bellows has a shape that is symmetrical with respect to a plane of symmetry of said optical path, and said retaining plate includes two pairs of tension directing corners symmetrically and transversely disposed with respect to said plane of symmetry for directing said tension forces along two pair of lines that are symmetrically disposed with respect to said plane of symmetry such that said bellows side walls and said forwardly extending portion fold inwardly along said two pairs of lines towards said plane of symmetry in response to moving said first, second, third, and fourth housing sections from said extended position towards said folded position.

21. A folding camera as defined in claim 16 wherein said optical means includes a viewing device mounted on said fourth housing section and said bellows includes an aperture in said forwardly extended portion thereof through which image-bearing light following an extension of said optical path follows is adapted to pass for transmission to said viewing device.

22. A collapsible and erectable bellows for use with a folding camera of the type having a housing comprising first, second, third and fourth housing sections interconnected as a four-bar linkage for movement between a compact folded position and an extended position wherein the four housing sections are spaced from one another to define a space therebetween, means in the first housing section for locating a film unit in position for exposure, and exposure means including optical means for exposing the film unit, the optical means including an objective lens for transmitting image-bearing light along an optical path in the space, and a mirror adapted to be positioned adjacent the third housing section for directing the light along an extension of the optical path towards a film unit located at the exposure position, and viewing means including a movable reflex member having lateral edges mounted in the first housing for movement between viewing position in overlying relation to a film unit at the exposure position for receiving light from the mirror and directing the light along yet another extension of the optical path to a viewing device mounted on the fourth camera housing section and an exposure position adjacent the mirror, said bellows comprising:

a single, flat, pre-shaped blank of flexible, light-opaque material, said blank having the general shape of a truncated triangle defined by a base edge, a pair of inwardly inclined and opposite side edges and a top edge that is substantially parallel to said base edge, said blank having an axis of symmetry that is substantially normal to said base edge and said blank having edges defining an inverted V-shaped notch on said axis extending from said top edge towards said base edge, said notch having its apex closest to said base edge;

said flexible material including a square woven fabric having oriented stretch characteristics whereby said fabric has minimum stretch in directions running with the warp and woof of said fabric and maximum stretch in directions running with the bias of said fabric, diagonally with respect to said warp and woof;

said blank including spaced mirror-image areas thereof, disposed on opposite sides of said axis, and intermediate said base and inclined side edges, for defining side walls of said bellows which are adapted to enclose the space between the extended first and third housing sections of the camera, each of said side walls including top and bottom edges adapted to be coupled, respectively, to the third and first housing sections, a leading edge extending between leading ends of said top and bottom edges, and a trailing end corner defined by the opposite ends of said top and bottom edges;

said fabric being oriented, when said blank is formed, so that the bias of said fabric runs in a direction of lines extending from said trailing end corners of said side walls to said leading edges thereof;

said blank further including another area thereof for defining a forward section of said bellows that extends forwardly from said bellows side wall to the second housing section for enclosing that portion of the optical path from the objective lens rearwardly to the leading edges of the bellows side walls, said forward section defining areas being intermediate said pair of side wall defining areas and being symmetrical said axis of symmetry;

said forward section defining area having an opening therein on said axis, said opening being adapted to be located in operative association with the camera lens on the second housing section for transmitting light from the lens along the optical path into the space;

said forward section defining area also including said opposing edges defining said V-shaped notch, each of said opposing edges having mirror-image notches therein, said opposing edges being adapted to be brought into mating side-by-side relation to form said forward section of said bellows, and wherein said mirror-image notches therein cooperate with each other to form an aperture through which light is directed from said space to the camera mounted viewing device;

means for coupling said top and bottom edges of said bellows side walls, respectively, to the third and first housing sections; and means for coupling a leading end of said forward section to the second housing section and for directing tension forces, applied to said bellows by the first and second housing section as they move from the extended position towards the folded position, along predetermined lines of said forward section and said side walls to establish fold lines, running substantially with said bias of said fabric, along which said bellows folds to assume its said collapsed position in response to moving the first, second, third and fourth housing sections from the extended position to the folded position.

* * * * *